United States Patent [19]
Norris

[11] Patent Number: 5,925,955
[45] Date of Patent: *Jul. 20, 1999

[54] LABYRINTH SEAL SYSTEM

[75] Inventor: Russell Hughes Norris, Portland, Oreg.

[73] Assignee: SAE Magnetics (H.K.) Ltd., Portland, Oreg.

[ * ] Notice: This patent is subject to a terminal disclaimer.

[21] Appl. No.: 08/856,975

[22] Filed: May 15, 1997

Related U.S. Application Data

[63] Continuation of application No. 08/712,615, Sep. 13, 1996, Pat. No. 5,714,817.

[51] Int. Cl.$^6$ .............................. H02K 5/16; F16C 33/80
[52] U.S. Cl. .......................... 310/90; 384/144; 384/480; 277/53; 277/56; 277/57
[58] Field of Search ............................. 310/90; 384/480, 384/144; 277/53, 56, 57

[56] References Cited

U.S. PATENT DOCUMENTS

| | | | |
|---|---|---|---|
| 3,691,542 | 9/1972 | Gabor | 340/174 |
| 3,706,085 | 12/1972 | Mowrey et al. | 340/174 |
| 3,957,147 | 5/1976 | Specht | 193/37 |
| 4,005,490 | 1/1977 | Duncan et al. | 360/97 |
| 4,373,759 | 2/1983 | Greener et al. | 308/187.2 |
| 4,458,957 | 7/1984 | Greener | 308/187.1 |
| 4,607,182 | 8/1986 | Ballhaus | 310/90 |
| 4,672,487 | 6/1987 | Brand et al. | 360/97 |
| 4,717,977 | 1/1988 | Brown | 360/98 |
| 4,739,427 | 4/1988 | Kilmer et al. | 360/97 |
| 5,006,943 | 4/1991 | Elässer et al. | 360/99 |
| 5,283,491 | 2/1994 | Jabbar et al. | 310/90 |
| 5,423,612 | 6/1995 | Zang et al. | 384/119 |
| 5,714,817 | 2/1998 | Norris | 310/90 |

*Primary Examiner*—Nestor Ramirez
*Assistant Examiner*—Tran N Nguyen
*Attorney, Agent, or Firm*—Chernoff, Vilhauer, McClung & Stenzel, LLP

[57] ABSTRACT

A labyrinth seal system of the present invention is found in a motor having a ball bearing ring, a shaft, and a labyrinth seal washer. The ball bearing ring has an inner bearing ring with an inner ring surface. In one embodiment the labyrinth seal system includes a shaft having a first shaft portion with a first shaft diameter and a second shaft portion with a second shaft diameter. The first shaft portion has a first outer shaft surface and the second shaft portion has a second outer shaft surface. A shaft shoulder may be formed between the first and second outer shaft surfaces. The second outer shaft surface is at least partially annularly adjacent the inner ring surface. Also included is a labyrinth seal washer having an annular leg that is positioned at least partially between the first outer shaft surface and the inner ring surface. The labyrinth seal system includes turbulence zones interspersed with narrow flow zones.

3 Claims, 2 Drawing Sheets

LABYRINTH SEAL SYSTEM

This is a continuation of application Ser. No. 08/712,615 filed on Sep. 13, 1996, now is U.S. Pat. No. 5,714,817.

BACKGROUND OF THE INVENTION

The following invention relates to a labyrinth seal for use in electronic spindle motors having ball bearing rings.

As shown in FIG. 1, electric spindle motors of the type used in disk drives conventionally use ball bearing rings 18 to facilitate movement between a rotary member and a stationary member. Ball bearing rings 18 generally include metallic or ceramic ball bearings 20 which are positioned between an inner bearing ring 22 and an outer bearing ring 24. Bearing rings 18 may be either inner or outer rotators depending on whether the hub 26 or shaft 28 rotates. Inner rotators have an inner bearing ring 22 which rotates, and outer rotators have an outer bearing ring 24 which rotates. The ball bearings 20 are preferably evenly spaced within the inner and outer bearing rings 22 and 24. The ball bearings 20 are generally held in this evenly spaced position by teeth of a ball bearing cage (not shown).

Bearing lubricant fluid is used in bearing rings 18 to encourage free movement of the ball bearings 20, inner bearing ring 22, and outer bearing ring 24. Conventionally, the lubricant is initially deposited on the teeth of the bearing cage. During use, however, the lubricant tends to migrate and eventually escapes the bearing ring 18. The lubricant that migrates and escapes the bearing ring 18 often enters the interior of the motor or exits the motor completely.

One cause of lubricant migration is the rotation of the bearing ring 18 and gravitational pull that causes the lubricant to be thrown from the bearing ring 18. Although lubricant generally is not thrown from a bearing ring 18 at lower rotation speeds, higher rotation speeds tend to disperse or "sling out" lubricant. At particularly high speeds the lubrication is atomized.

Another cause of lubricant migration is airflow through the motor and bearing rings 18 which tends to push lubricant, particularly atomized lubricant, out of the bearing ring 18. Airflow also tends to carry particles and contaminants. The use of bearing shields 30 reduces the flow of air and contaminants through the bearing ring 18 and thereby partially inhibits the loss of lubricant from the bearing ring 18.

Once the lubricant escapes the bearing ring 18 it enters the horizontal gap 32 between the top surface of the ball bearing ring 18 and the bottom surface of the washer 34 (or other enclosing apparatus). The lubricant then travels from the gap 32 up through the vertical air gap 36 between the inner surface 38 of the washer 34 and the smooth outer surface 39 of the shaft 28. The lubricant then can escape the motor.

Using fluid labyrinths to prevent lubrication fluid from escaping a fluid bearing spindle motor is shown in U.S. Pat. No. 5,536,088 which is assigned to the same assignee as the present application, the disclosure of which is hereby incorporated by reference. Fluid labyrinths found in such fluid bearing spindle motors are generally the winding path in which the lubrication fluid resides, at least part of which forms the fluid bearings.

Fluid labyrinths are not used with ball bearing spindle motors because the lubrication fluid is not intended as a bearing but instead is used to facilitate rotation between the ball bearings 20 and the inner and outer bearing rings 20, 24. Accordingly, the lubrication fluid is not intended to enter the air gaps 32 and 36.

SUMMARY OF THE INVENTION

A labyrinth seal system of the present invention significantly prevents lubricant escaping the motor.

A motor incorporating the labyrinth seal system includes at least one rotating member that rotates in relation to another member. The rotating member is separated from the other member by a ball bearing ring that has an inner bearing ring and an outer bearing ring separated by a plurality of ball bearings. The inner bearing ring has an inner ring surface.

The labyrinth seal system may also include a shaft having a first shaft portion with a first shaft diameter and a second shaft portion with a second shaft diameter. The first shaft diameter is narrower than the second shaft diameter. The first shaft portion has a first outer shaft surface and the second shaft portion has a second outer shaft surface. A shaft shoulder may be formed between the first and second outer shaft surfaces. The second outer shaft surface is at least partially annularly adjacent the inner ring surface.

A labyrinth seal washer is also included in the present invention. The labyrinth seal washer has an annular leg positioned at least partially between the first outer shaft surface and the inner ring surface.

As configured, the labyrinth seal system includes a first turbulence zone between the lower seal surface and the upper ring surface. A first narrow flow zone is formed between the inner ring surface and the outer leg surface. A second turbulence zone is then formed between the shaft shoulder and the leg tip. Finally, a second narrow flow zone is formed between the inner leg surface and the first outer shaft surface.

One advantage of the present invention is the longer path that the lubricant has to follow makes it more difficult for lubricant to escape the motor. Since the lubricant has to flow farther to exit the motor, the longer path effectively creates a seal.

Another advantage of the present invention is that the radial opening leading to the exterior of the motor (between the shaft and the leg of the labyrinth seal washer) is generally smaller than the radius of the inner bearing ring opening. The reduced radius is significant because it means that the radial opening has less surface area for automized lubricant to flow from the motor.

Yet another advantage is that gaps between the LSW, shaft, and bearing may act as turbulence zones. By increasing turbulence the flow of the lubricant is slowed.

A final advantage is that the path created by the LSW, in which the escaping lubricant flows has several corners which cause the lubricant to change the direction in which it is flowing. Each change of direction causes the lubricant to have an energy loss. The turns, like the gaps also tend to create turbulence zones by "stirring up" the lubrication.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
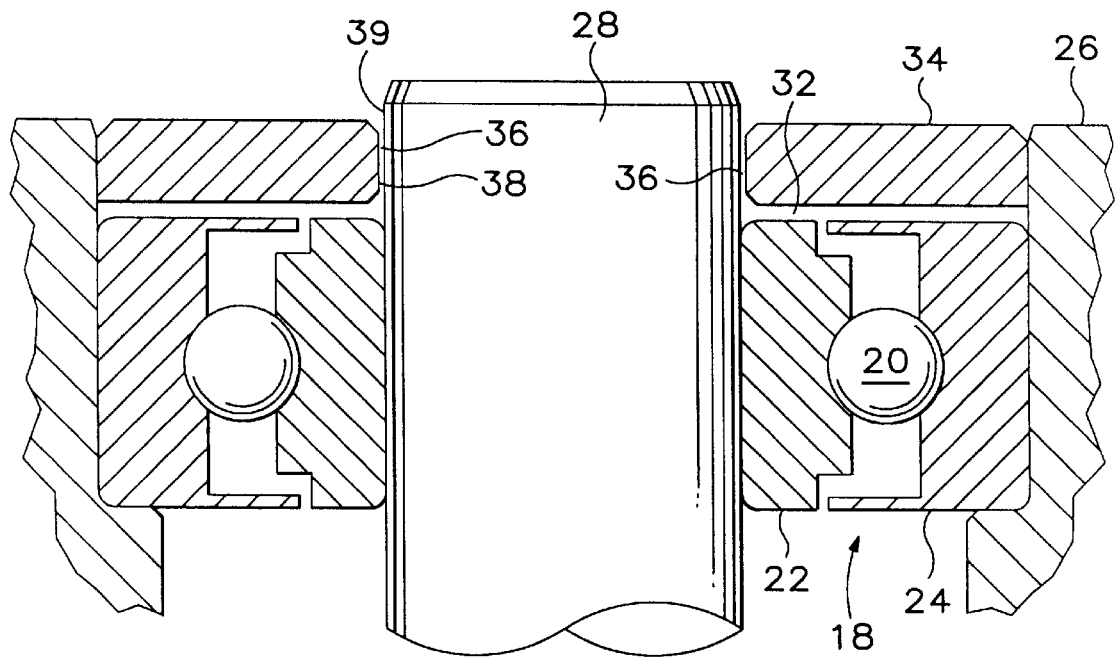
FIG. 1 is a partial side sectional view of a known ball bearing ring and seal washer.
Figure 2:
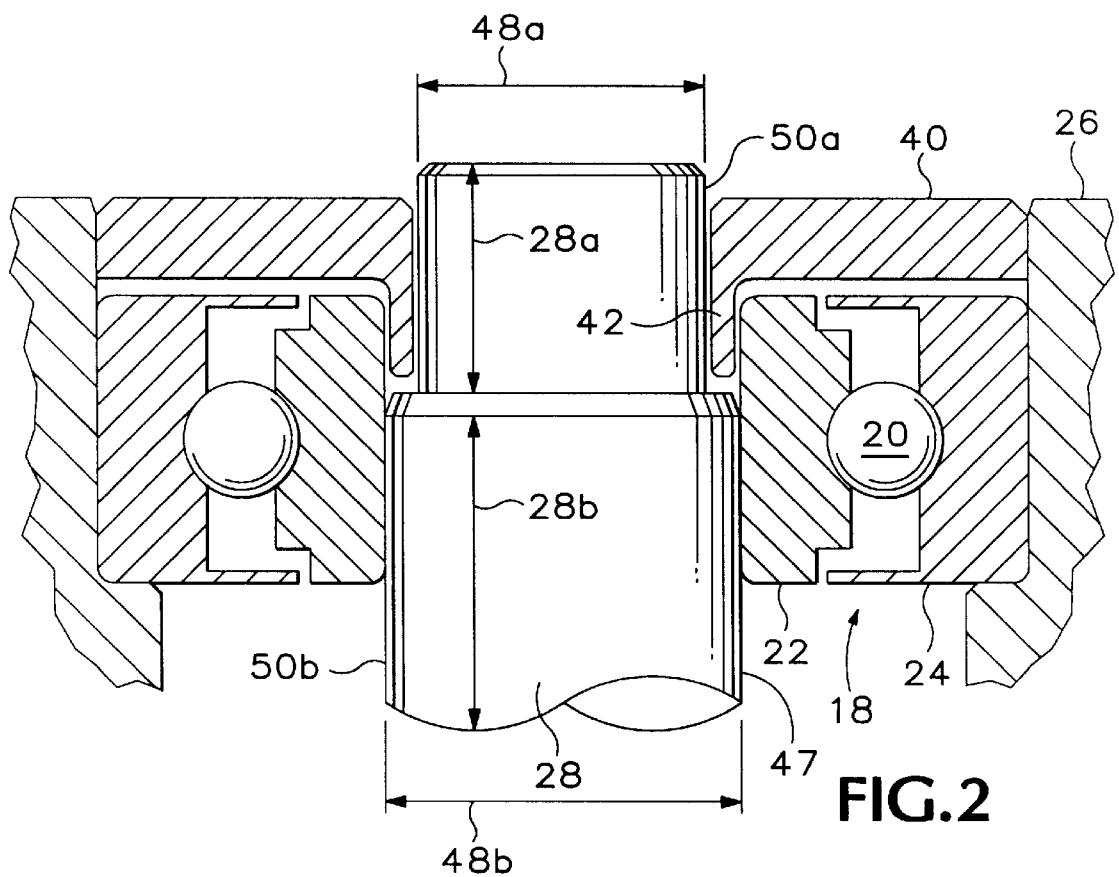
FIG. 2 is a partial side sectional view of a ball bearing ring and labyrinth seal washer of the present invention.
Figure 3:
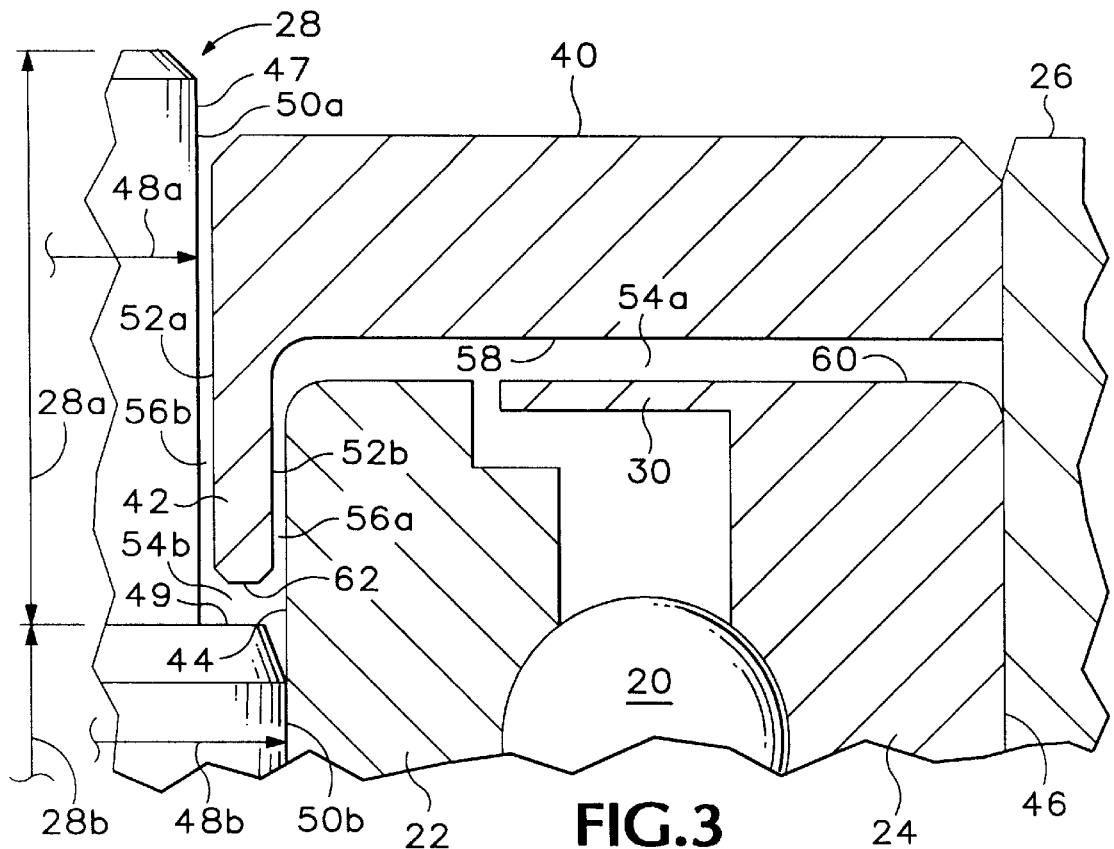
FIG. 3 is an expanded side sectional view of the labyrinth seal of the present invention.

As shown in FIGS. 2 and 3, the present invention is a labyrinth seal system formed by substituting a labyrinth seal washer (LSW) 40 for the standard, flat washer 34 (FIG. 1) of conventional motors. Shown in cross section, the LSW 40 is L-shaped. Accordingly, the LSW 40 has an annular leg 42 that projects downward and, when in position, is in a spaced annularly relationship to the shaft 28.

As set forth above, like a standard motor, motors incorporating the present invention include a bearing ring 24. The inner bearing ring 22 and the outer bearing ring 24 are separated by a plurality of ball bearings 20. The inner bearing ring 22 has an inner ring surface 44 substantially adjacent the shaft 28 and the outer bearing ring 24 has an outer ring surface 46 adjacent the hub 26. Because the inner bearing ring 22 and the outer bearing ring 24 can rotate freely relative to each other, either the shaft 28 or the hub 26 can rotate depending on the design of the motor.

As shown, the leg 42 of the labyrinth seal washer 40 is positioned at least partially between the outer surface 47 of the shaft 28 and the inner ring surface 44 of the inner bearing ring 22. Having the annular leg 42 positioned between the shaft 28 and inner bearing ring 22 has not been done before because it was necessary that the bearing ring 18 be centrifugally locked or physically fixed to the shaft 28. Using the design as set forth below, however, calculation has shown that the bond strength between the inner bearing surface 44 and the shaft 28 is sufficient if at least 60% of the inner ring surface 44 is adjacent the shaft 28. This fact permitted the leg 42 to be positioned at least partially between the inner bearing ring 22 and the shaft 28.

To accommodate the leg 42 between the inner bearing ring 22 and the shaft 28, a gap partially there between had to be created. Accordingly, in one embodiment an annular notch was created in the standard shaft 28 to accommodate the annular leg 42 of the LSW 40. More specifically, in this embodiment, the shaft 28 has a first shaft portion 28a with a first shaft diameter 48a and a second shaft portion 28b with a second shaft diameter 48b. The first shaft diameter 48a is narrower than the second shaft diameter 48b. In this manner, the first shaft portion 28a is narrower than the second shaft portion 28b. The short jog 49 between the first shaft portion 28a and the second shaft portion 28b appears as a shoulder.

The first shaft portion 28a has a first outer shaft surface 50a and the second shaft portion 28b has a second outer shaft surface 50b. The annular leg 42 has an inner leg surface 52a and an outer leg surface 52b. The first outer shaft surface 50a is at least partially annularly parallel the inner leg surface 52a. Further, the second outer shaft surface 50b is at least partially annularly adjacent the inner ring surface 44 of the inner bearing ring 22. Still further, the inner ring surface 44 is at least partially annularly parallel the outer leg surface 52b. In other words, the inner ring surface 44 is partially annularly parallel both the outer leg surface 52b and the second outer shaft surface 50b.

When the LSW 40 is in place, there are turbulence zones 54a and 54b and narrow flow zones 56a and 56b that are formed between the surfaces of the bearing ring 18, LSW 40, and shaft 28. More specifically, a first turbulence zone 54a is formed between the lower surface 58 of the LSW and the upper surface 60 of bearing 18 (including the bearing shield 30 if there is one). A first narrow flow zone 56a is formed between the inner ring surface 44 and the outer leg surface 52b. The second turbulence zone 54b is formed between the tip 62 of leg 42 and the jog 49 of the shaft 28. Finally, the second narrow flow zone 56b is formed between the inner leg surface 52a and the first outer shaft surface 50a.

After the atomized lubricant leaves the bearing ring 18 it is carried by airflow into the first turbulence zone 54a. From the first turbulence zone 54a, the airflow then carries the atomized lubricant into the first narrow flow zone 56a, the second turbulence zone 54b, and finally into the second narrow flow zone 56b.

The alternation of narrow flow zones 56a, 56b and wide turbulence zones 54a, 54b is significant. In the wide turbulence zones 54a, 54b the pressure of the flow is increased and the velocity is decreased. In the narrow flow zones 56a, 56b the pressure of the flow is decreased and the velocity is increased. By increasing the turbulence, the flow of the escaping lubricant is slowed.

Figure 4:
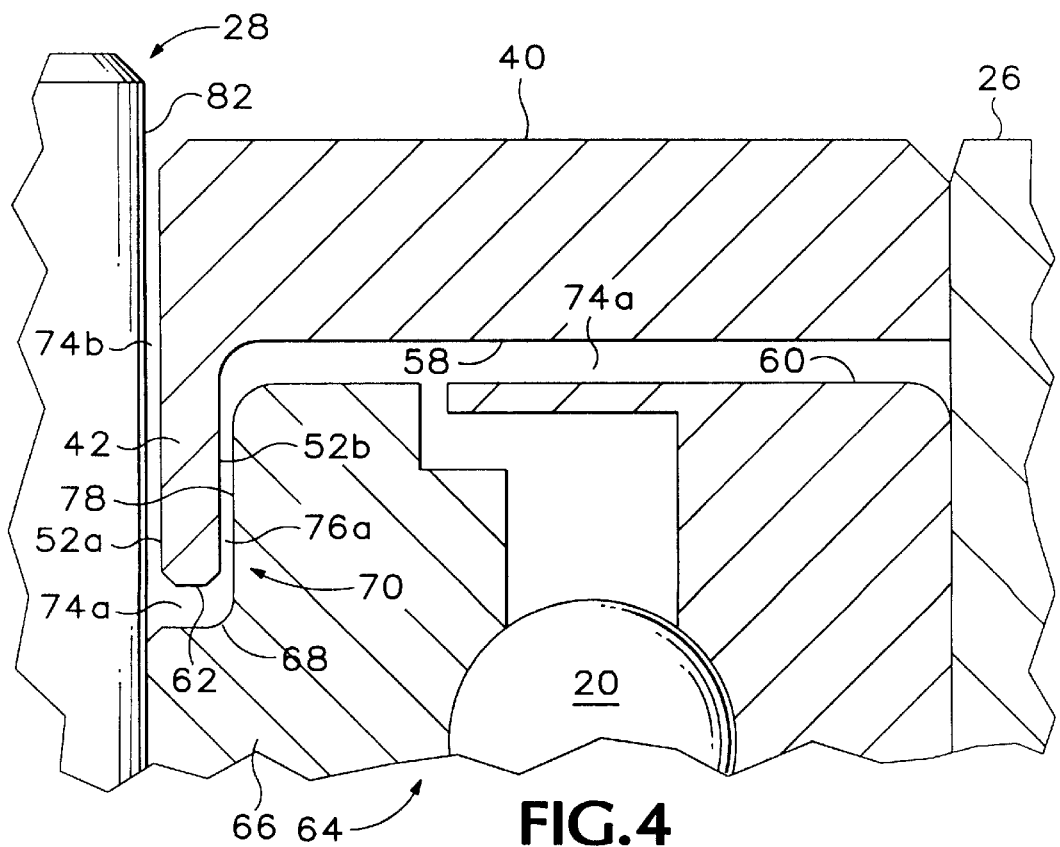
FIG. 4 is a modified embodiment of a ball bearing ring and labyrinth seal washer.

FIG. 4 shows an alternate embodiment that includes a standard shaft 28, a modified ball bearing ring 64, and a LSW 40. The modified ball bearing ring 64 is substantially identical to standard ball bearing rings except that it has a modified inner bearing ring 66 that has an annular notch 68 in an upper corner 70. The annular notch 68 accommodates the annular leg 42 of the LSW 40. In this embodiment, turbulence zones and narrow flow zones are also formed. More specifically, a modified first turbulence zone 74a is formed between the lower surface 58 of LSW 40 and the upper surface 60 of modified bearing 64. A modified first narrow flow zone 76a is formed between the notch surface 78 parallel to the shaft 28 and the outer leg surface 52b. The modified second turbulence zone 74b is formed between the tip 62 of leg 42 and the notch surface 80 perpendicular to the shaft 28. Finally, the modified second narrow flow zone 76b is formed between the inner leg surface 52a and the outer shaft surface 82.

It should be noted that shown bearing ring 18 is meant to be exemplary. In alternate embodiments the bearing ring may include no shields, one shield, or two shields as shown. The shields may be integral, as shown, or may be external such as the shields shown in U.S. patent application Ser. No. 08/581,058 which is assigned to the same assignee as the present application, the disclosure of which is hereby incorporated by reference.

Finally, it should be noted that the bearing lubricant may be any lubricant such as oil. Preferably, the lubricant includes a rust inhibiting agent. Further, the lubricant may be a combination of a base and grease.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a motor having at least one rotating member, a labyrinth seal system comprising:

(a) a ball bearing ring including an inner bearing ring and an outer bearing ring separated by a plurality of ball bearings, said inner bearing ring having an inner ring surface;

(b) a shaft having a first shaft portion with a first shaft diameter and a second shaft portion with a second shaft diameter, said first shaft diameter being narrower than said second shaft diameter, said first shaft portion having a first outer shaft surface and said second shaft portion having a second outer shaft surface, said second outer shaft surface at least partially annularly adjacent said inner ring surface; and (c) a labyrinth seal washer having an annular leg positioned at least partially between said first outer shaft surface and said inner ring surface.

2. A labyrinth seal system comprising:

(a) a shaft having an outer shaft surface;

(b) a bearing ring surrounding said shaft, said bearing ring having an inner ring surface at least partially adjacent said outer shaft surface; and (c) a labyrinth seal washer having an annular washer surface and an annular leg, said annular leg perpendicular said annular washer surface;

(d) wherein said annular leg at least partially between said outer shaft surface and said inner ring surface.

3. The seal system of claim 2 wherein said shaft has a first shaft portion and a second shaft portion and said annular leg has an inner leg surface and an outer leg surface, said first shaft portion being parallel said inner leg surface, and said outer leg surface and said second shaft portion being parallel said inner ring surface.

\* \* \* \* \*